Patented Dec. 8, 1931

1,835,433

UNITED STATES PATENT OFFICE

WERNER SCHMIDT, OF FRANKFORT-ON-THE-MAIN/MAINKUR, GERMANY, ASSIGNOR TO WINTHROP CHEMICAL COMPANY, INC., OF NEW YORK, N. Y., A CORPORATION OF NEW YORK

ORTHO-HYDROXY-BENZYLAMINE ARSONIC ACIDS AND PROCESS OF MAKING SAME

No Drawing. Application filed May 22, 1928, Serial No. 279,854, and in Germany May 31, 1927.

The present invention relates to new ortho-hydroxy-benzyl-amine arsonic acids and to a process of preparing the same.

I have found that new ortho-hydroxy-benzylamine arsonic acids of the general formula:

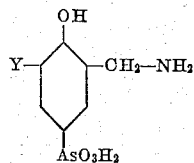

wherein Y stands for hydrogen or methyl, are obtained by diazotizing 1-amino-4-hydroxy-5-benzyl-aroyl-amines of the general formula:

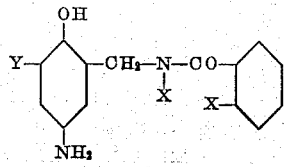

wherein the X's stand for hydrogen atoms which may be jointly replaced by a CO-group, and Y has the aforesaid signification, acting on the diazocompounds thus formed with an alkali arsenite in an alkaline solution and treating the 4-hydroxy-5-benzyl-aroyl-amine-1-arsonic acids thus obtained with saponifying agents.

The 1-amino-4-hydroxy-5-benzyl-aroyl-amines used as starting materials for my process may be prepared by condensing para-nitrophenol compounds with hydroxy-methyl-aroyl-amines and reducing the 1-nitro-4-hydroxy-5-benzyl-aroyl-amines thus formed as described by Einhorn in Liebig's Annalen, vol. 343, page 223.

One may proceed also in such a manner, that 4-hydroxy-5-benzyl-aroyl-amine-1-arsonic acids are produced according to my copending application Serial No. 279,855, filed May 22, 1928, and are treated subsequently with saponifying agents.

The new compounds obtained by my process possess a good therapeutical activity and are of an especial importance because they lack any neurotoxic action. They may also be used as starting materials for manufacturing other pharmaceutical products.

In order to further illustrate my invention the following examples are given, the parts being by weight and all temperatures in Centigrade degrees; but I wish to be understood that my invention is not limited to the examples given, nor to the exact conditions stated therein.

Example 1

(a) Manufacture of the 4-hydroxy-5-benzyl-benzoylamine-1-arsonic acid of the formula:

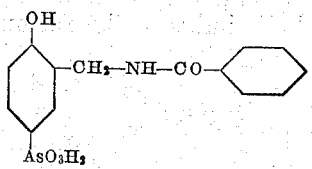

24,2 parts of 1-amino-4-hydroxy-5-benzyl-benzoylamine, described by Einhorn in Liebig's Annalen, vol. 343, page 248, are suspended in 200 parts of water and 200 parts of ice with the addition of 32 parts of hydrochloric acid ($d=1,185$) and diazotized at 0-5° by means of a solution of 7 parts of sodium nitrite in 20 parts of water. The diazocompound thus obtained is allowed to run while well stirring into a mixture of 150 parts of water, 30 parts of sodium arsenite and 10 parts of copper sulfate, warmed to about 60°. By adding about 60 parts of soda the solution is kept alkaline. When the evolution of nitrogen is finished, the mass is filtered and acidified with hydrochloric acid. After cooling down the arsonic acid compound separates. It is purified by dissolving it in a dilute solution of sodium acetate with the addition of animal charcoal and precipitating the filtrated solution by means of hydrochloric acid. It is identical with the compound described in the Example 1 of my copending U. S. application Serial No. 279,855, filed May 22, 1928.

(b) Manufacture of the 4-hydroxy-5-benzylamine-1-arsonic acid of the formula:

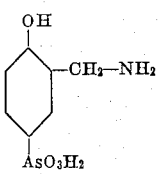

25 parts of 4-hydroxy-5-benzyl-benzoylamine-1-arsonic acid prepared as described sub-paragraph (a) or according to my copending application are boiled under a reflux condenser with 100 parts of water and 60 parts of a caustic soda solution of 33° Bé for about 5 hours. Then the mass is diluted with 100 parts of water, filtered in the cold and mixed with 90 parts of hydrochloric acid ($d=1,15$). After cooling down to 0° the precipitated benzoic acid is filtered off. The filtrate thereof is warmed at about 75° and neutralized with sodium acetate. From this solution the new compound crystallizes in the form of fine needles melting above 290°. It is easily soluble in dilute mineral acids, in alkalies and in solutions of alkali carbonates, difficulty soluble in a solution containing an excess of sodium acetate, in acetone, methylalcohol and ethylalcohol, insoluble in ether, benzene and benzine.

Example 2

(a) Manufacture of 1-amino-4-hydroxy-5-benzyl-phthalic imide of the formula:

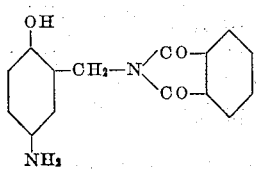

700 parts of para-nitrophenol and 900 parts of hydroxy-methyl-phthalic-imide are well mixed and introduced at 15–20° into 400 parts of sulfuric acid of 66° Bé. Then the temperature is allowed to rise to 30° and after about half an hour the solidified mass is poured on ice-water.

The new condensation product separates in the form of a light yellow powder melting at 225–226° and corresponds to the formula:

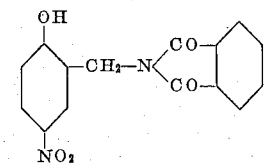

It is nearly insoluble in water, difficultly soluble in alkalies forming a yellow solution. By reducing it with iron and acetic acid the new 1-amino-4-hydroxy-5-benzyl phthalic imide is obtained. This base crystallizes from a mixture of methanol and ether in the form of colorless needles melting at 95–97°, it is easily soluble in alcohol, difficultly soluble in water, insoluble in ether.

(b) Manufacture of the 4-hydroxy-5-benzyl phthalic imide-1-arsonic acid of the formula:

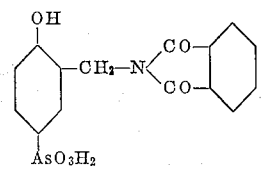

268 parts of 1-amino-4-hydroxy-5-benzyl phthalic imide prepared as described sub (a), are dissolved in 300 parts of hydrochloric acid ($d=1,185$) and 5000 parts of water and diazotized at 0–5° with a solution of 70 parts of sodium nitrite in 300 parts of water. This diazo solution is allowed to run at 50–55° into a solution of 400 parts of sodium arsenite in 4000 parts of water, while 600 parts of soda are gradually added in order to keep the mixture alkaline. When a test no longer couples with an alkaline solution of resorcinol, the reaction product is separated by the addition of common salt. It is purified by extracting with acetone and then with a small quantity of spirit. The residue therefrom is dissolved in a sodium acetate solution and after having been decolorized by means of animal charcoal the solution is precipitated by addition of an acid.

The compound thus obtained is identical with the 4-hydroxy-5-benzyl-phthalic-imide-1-arsonic acid described in the Example 2 of my copending U. S. application Serial No. 279,855, filed May 22, 1928. It yields when saponified according to the foregoing example sub-paragraph (b), the same hydroxybenzylamine arsonic acid as there described.

Example 3

When starting from 800 parts of paranitro-cresol of the formula:

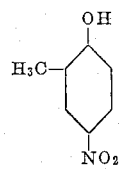

and of the melting point 95° and working otherwise as described in Example 2, the 4-hydroxy-3-methyl-5-benzyl-phthalidimide-1-arsonic acid is obtained. It is identical to the compound described in Example 4 of the copending application executed by me on the same date. By means of saponifying agents it yields the 4-hydroxy-3-methyl-5-benzylamine-1-arsonic acid of the formula:

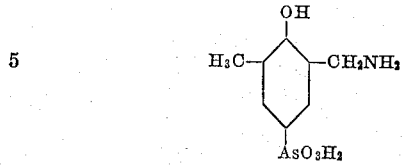

This product melts above 290°; it is easily soluble in alkalies and in dilute mineral acids, difficultly soluble in an alkali acetate solution and in spirit, insoluble in ether, benzene and benzine.

I claim:

1. Process for manufacturing ortho-hydroxy-benzylamine arsonic acids which process comprises diazotizing 1-amino-4-hydroxy-5-benzyl-aroylamines of the general formula:

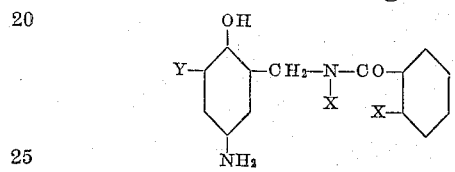

wherein the X's stand for hydrogen atoms which may be jointly replaced by a CO-group and Y stands for hydrogen or methyl, acting on the diazo compounds thus formed with an alkali arsenite in an alkaline solution and treating the 4-hydroxy-5-benzyl-aroylamine-1-arsonic acids obtained with saponifying agents.

2. Process for manufacturing ortho-hydroxy - benzylamine - arsonic acids, which process comprises treating 4-hydroxy-5-benzyl-aroylamine-1-arsonic acids of the general formula:

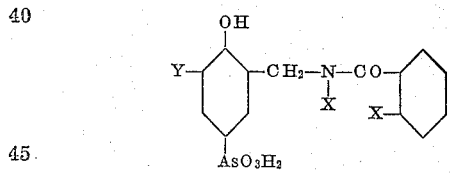

wherein the X's stand for hydrogen atoms which may be jointly replaced by a CO-group and Y stands for hydrogen or methyl, with saponifying agents.

3. As new products ortho-hydroxy-benzylamine-arsonic acids of the general formula:

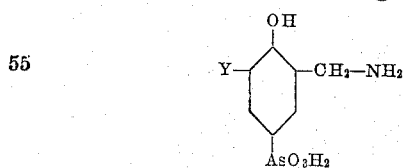

wherein Y stands for hydrogen or the methyl group, which products are colorless crystalline substances, having a definite melting point, difficultly soluble in organic solvents, easily soluble in mineral acids and in alkaline agents.

4. As a new product the 4-hydroxy-5-benzylamine-1-arsonic acid of the formula:

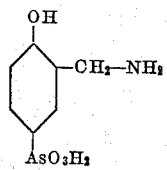

which product represents fine needles melting above 290° C., easily soluble in dilute mineral acids, in alkalies and in solutions of alkali carbonates, difficultly soluble in a solution of excessive alkali acetate, in acetone, methyl and ethyl alcohol, insoluble in ether, benzene and benzine.

In testimony whereof, I affix my signature.

WERNER SCHMIDT.